(12) United States Patent
Martin et al.

(10) Patent No.: US 10,562,242 B2
(45) Date of Patent: Feb. 18, 2020

(54) METHOD AND APPARATUS FOR APPLICATION OF THERMOSETTING TAPE ON SURFACES

(71) Applicant: MI INTÉGRATION S.E.N.C., Sherbrooke (CA)

(72) Inventors: Yves Martin, Sherbrooke (CA); Claude Houle, Austin (CA); Yannick Longpré, Sherbrooke (CA); Nicolas Nadeau, Sherbrooke (CA)

(73) Assignee: MI INTEGRATION S.E.N.C., Sherbrooke, QC (CA)

( * ) Notice: Subject to any disclaimer, the term of this patent is extended or adjusted under 35 U.S.C. 154(b) by 149 days.

(21) Appl. No.: 15/760,113

(22) PCT Filed: Sep. 20, 2016

(86) PCT No.: PCT/CA2016/051099
§ 371 (c)(1),
(2) Date: Mar. 14, 2018

(87) PCT Pub. No.: WO2017/049390
PCT Pub. Date: Mar. 30, 2017

(65) Prior Publication Data
US 2018/0250892 A1 Sep. 6, 2018

Related U.S. Application Data

(60) Provisional application No. 62/221,175, filed on Sep. 21, 2015.

(51) Int. Cl.
*B29C 70/38* (2006.01)
*B29K 101/10* (2006.01)

(52) U.S. Cl.
CPC ........ *B29C 70/388* (2013.01); *B29K 2101/10* (2013.01)

(58) Field of Classification Search
CPC ... B29C 63/0073; B29C 63/024; B29C 65/50; B29C 65/5092; B29C 65/7802;
(Continued)

(56) References Cited

U.S. PATENT DOCUMENTS

| 3,810,805 A | 5/1974 | Hardesty |
| 4,750,965 A | 6/1988 | Pippel et al. |

(Continued)

FOREIGN PATENT DOCUMENTS

DE 102012017595 A1 3/2014

OTHER PUBLICATIONS

Canadian application 2983809 notice of allowance dated Sep. 10, 2018.
(Continued)

*Primary Examiner* — John L Goff, II
(74) *Attorney, Agent, or Firm* — Anglehart et al.

(57) ABSTRACT

There is provided a method for applying thermosetting tape on contoured resilient surfaces off an object which comprises biasing selected section(s) of the resilient member to minimize tape and object distortion. There is also provided a tape laying apparatus configured to enable the optimization of automatic tape application on resilient contoured surfaces and minimize tape and object distortion.

20 Claims, 10 Drawing Sheets

(58) Field of Classification Search
CPC ... B29C 66/022; B29C 66/343; B29C 66/344; B29C 66/345; B29C 70/38; B29C 70/382; B29C 70/384; B29C 70/386; B29C 70/388; Y10T 156/1788; Y10T 156/1795; B29K 2101/10
USPC .................................................. 156/574, 577
See application file for complete search history.

(56) References Cited

U.S. PATENT DOCUMENTS

| | | | |
|---|---|---|---|
| 5,700,347 A | 12/1997 | McCowin | |
| 8,893,758 B2* | 11/2014 | Genssen | B29C 70/388 |
| | | | 156/433 |
| 10,189,214 B2* | 1/2019 | Ho Yew Chi | B29C 70/38 |
| 2014/0202611 A1 | 7/2014 | Schaaf et al. | |

OTHER PUBLICATIONS

Canadian application 2983809 office action dated Jan. 30, 2018.
Canadian application 2983809 office action dated May 16, 2018.
EP application 16847677 Europinon search opinion dated Apr. 15, 2019.
EP application 16847677 Europinon supplement search report dated Apr. 15, 2019.
PCT/CA2016/051099 IPRP1.
PCT/CA2016/051099 ISR with related claims.
PCT/CA2016/051099 search strategy.

* cited by examiner

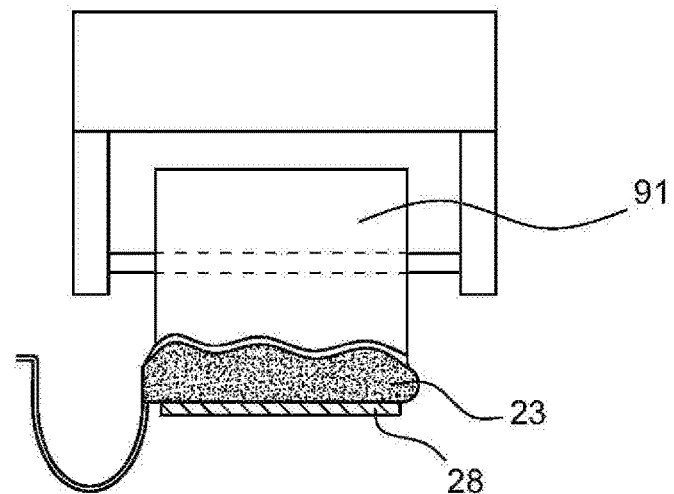
FIG. 9
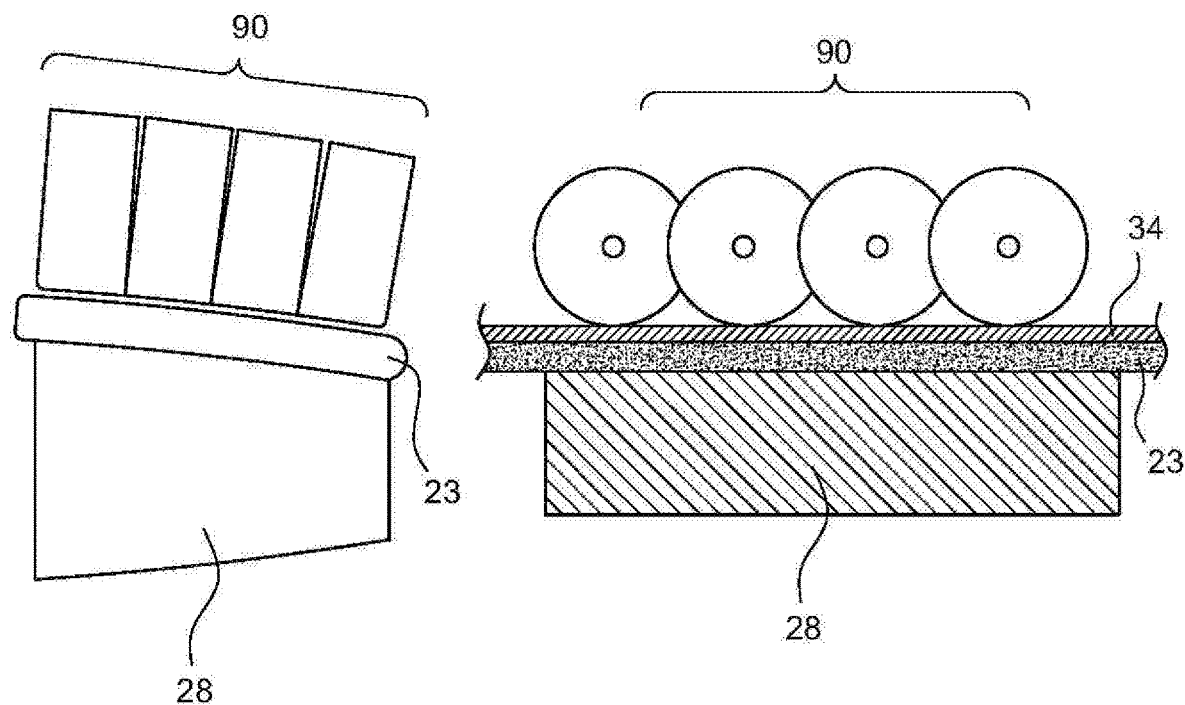
FIG. 10A
FIG. 10B

METHOD AND APPARATUS FOR APPLICATION OF THERMOSETTING TAPE ON SURFACES

This application claims the benefit of priority of U.S. provisional patent applications 62/221,175 filed Sep. 21, 2015

TECHNICAL FIELD

This invention relates generally to methods and apparatus for applying thermosetting tape to surfaces.

BACKGROUND

The application of thermosetting tapes to surfaces is found in many applications. For example application of thermosetting tapes on extruded material is well known. In this process the heat generated by the extrusion is used to set the heat activated tape on the surface at the exit of the extrusion process.

However certain types of molded products, such as molded automobile parts, medical equipment and the like sometimes exhibit complex contours. The automated application of thermosetting tape on such products can be challenging especially when these products must respect narrow specifications.

Thermosetting robotized heads are known in the art. Taping machines that applies heat activated tape on extruded parts are also known. For example U.S. Pat. No. 5,700,347 describes a thermosetting head for the simultaneous laying down of a plurality of tapes side by side for composites production. The heads may comprise tape guiding assemblies and heat delivering parts so that the thermosetting tape can be applied while the head and the substrate to which the tape is applied are in relative motions.

U.S. Pat. No. 8,052,819 describes a fiber application head for the application of a band of fibers on convex surfaces.

European patent 2730385 describes a heat controlled system for the production of consolidated layers made of fiber reinforced polymers.

However these apparatuses for applying thermosetting tape are often inadequate for the automatic application of thermosetting tapes on heavily contoured surfaces. Often, automated application of the tape results in tape distortion or "wrinkling" in region of high curvature. Furthermore, there is also a lack of flexibility to simultaneously control heat delivery and changes of direction in the application of the tape on contoured surfaces.

Given the limitations of the prior art, application of thermosetting tape on contour surfaces is still often time done manually. There is therefore a need for automated systems for the application of thermosetting tapes to contoured surfaces.

SUMMARY

In one embodiment of the invention there is provided a method for applying a thermosetting tape on a tape receiving surface of a resilient contoured member of an object, the method comprising providing a tape laying apparatus comprising a tape laying head, an object retaining support to stabilize object while tape is laid onto the tape receiving surface and a resilient contoured member positioning guide, biasing, with said resilient contoured member positioning guide, at least one section of the resilient contoured member to position the tape receiving surface of the at least one section at a predetermined angle relative to a plane defined by a tape laying direction axis and an axis perpendicular to said tape laying direction axis, said predetermined angle being different than a resting angle of said at least one section, and contacting the tape with the tape receiving surface to produce a taped surface, applying a pressure on the taped surface while the tape laying head is displaced in a tape laying direction, and directing heat at the tape and tape receiving surface near a tape-surface contact point to activate binding.

In another embodiment there is provided an apparatus for applying heat activated tape on a resilient contoured member of an object, said resilient contoured member attached to a non-resilient member of the object, the resilient contoured member having a tape receiving surface exhibiting a contour with respect to the non-resilient member along a tape laying direction, the apparatus comprising: an object support mounted on a support frame to maintain the object in fixed position during tape application, a tape laying head configured to be displaced along the resilient contoured member in the tape laying direction, a tape dispenser to feed tape to the tape laying head, a tape guide assembly and a tape presser assembly mounted on the tape laying head, the tape presser assembly mounted downstream of the tape guide assembly, wherein the tape guide assembly is configured to guide the tape to the tape presser assembly, said tape presser assembly comprising a tape contact member configured to guide the tape on the tape receiving surface and apply pressure on the tape and the tape receiving surface as the tape is laid onto the tape receiving surface and defining a tape contact line between the tape and the tape receiving surface and a tape presser assembly contact surface, a heater (heat directing means) configured to direct heat substantially at the tape contact line to heat activate binding of the tape to the resilient contoured member as the tape laying head is displaced along the object, a resilient contoured member positioning guide configured to bias at least one section of the resilient contoured member to position the tape receiving surface of the at least one section at a predetermined angle relative to a plane defined by a tape laying direction axis and an axis perpendicular to said tape laying direction axis while providing support for tape laying, said predetermined angle being different than a resting (non-biased) angle of said at least one section, and wherein said resilient contoured member positioning guide is also configured to provide support for tape laying along substantially all the tape receiving surface.

BRIEF DESCRIPTION OF THE DRAWINGS

The invention will be better understood by way of the following detailed description of embodiments of the invention with reference to the appended drawings, in which:

FIG. 9 is a cross-sectional view of an embodiment of a deformable roller of the invention.

FIG. 10A is a cross-sectional view of an embodiment of a segmented roller of the invention.

FIG. 10B is a side cross-sectional view of an embodiment of a segmented roller of the invention.

DETAILED DESCRIPTION

In the present description by thermosetting tape it is meant any tape or adhesive flexible material applicable on a surface, the binding of which to surfaces is activated by heat. For example the thermosetting material may be epoxy-based, polyester-based, polyimides-based and the like. The thermosetting tape can serve as an adhesive-bearing surface for a textured material such as flocking for example.

Figure 1:
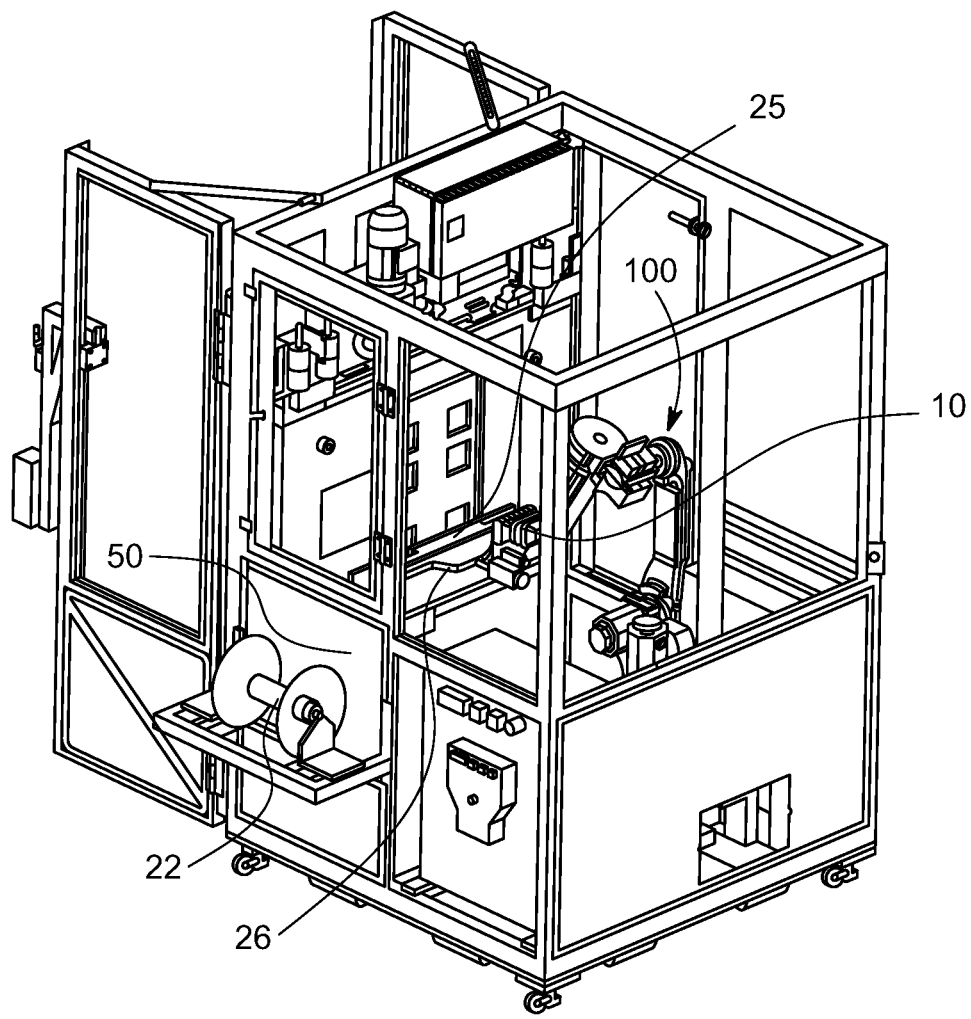
FIG. 1 is perspective view of an embodiment of the thermosetting tape application system of the invention.

In one embodiment of the present invention there is provided an apparatus for applying thermosetting tapes to objects or substrates and is particularly adapted to apply thermosetting tapes on resilient contoured members of objects. That is to say of resilient contoured member that is connected to or molded to or otherwise attached to a non-resilient part. With reference to FIG. 1 the apparatus generally comprises a tape laying head 10, a tape dispenser 22, an object support frame 25 for positioning and supporting the object 26. The heat source required to heat activate tape binding will be described below. The different parts of the system can be arranged to minimize heat accumulation around the tape dispenser and in particular it is preferable that the tape spool be located in a different enclosure or far enough from the head to avoid heating the tape prior to its application on the tape receiving surface. In the case where the tape is kept in a separate enclosure the tape can be passed through a slit for example in a separating junction or wall 50.

The tape laying head 10 is mounted on a structure allowing movement of the head, relative to the object to be taped, along at least two axes and preferably along multiple axes. For example, the head can be mounted on a rail system. Preferably the head is mounted on a robot 100 with multi-axes motion capabilities to control and adjust the position of the head relative to the tape receiving surface. Such robots are well known in the art, such as 5-axis or 6-axis articulated arms robots. As will be appreciated the robot is controlled by a computerized controller or system processor that will further described below.

Figure 2:
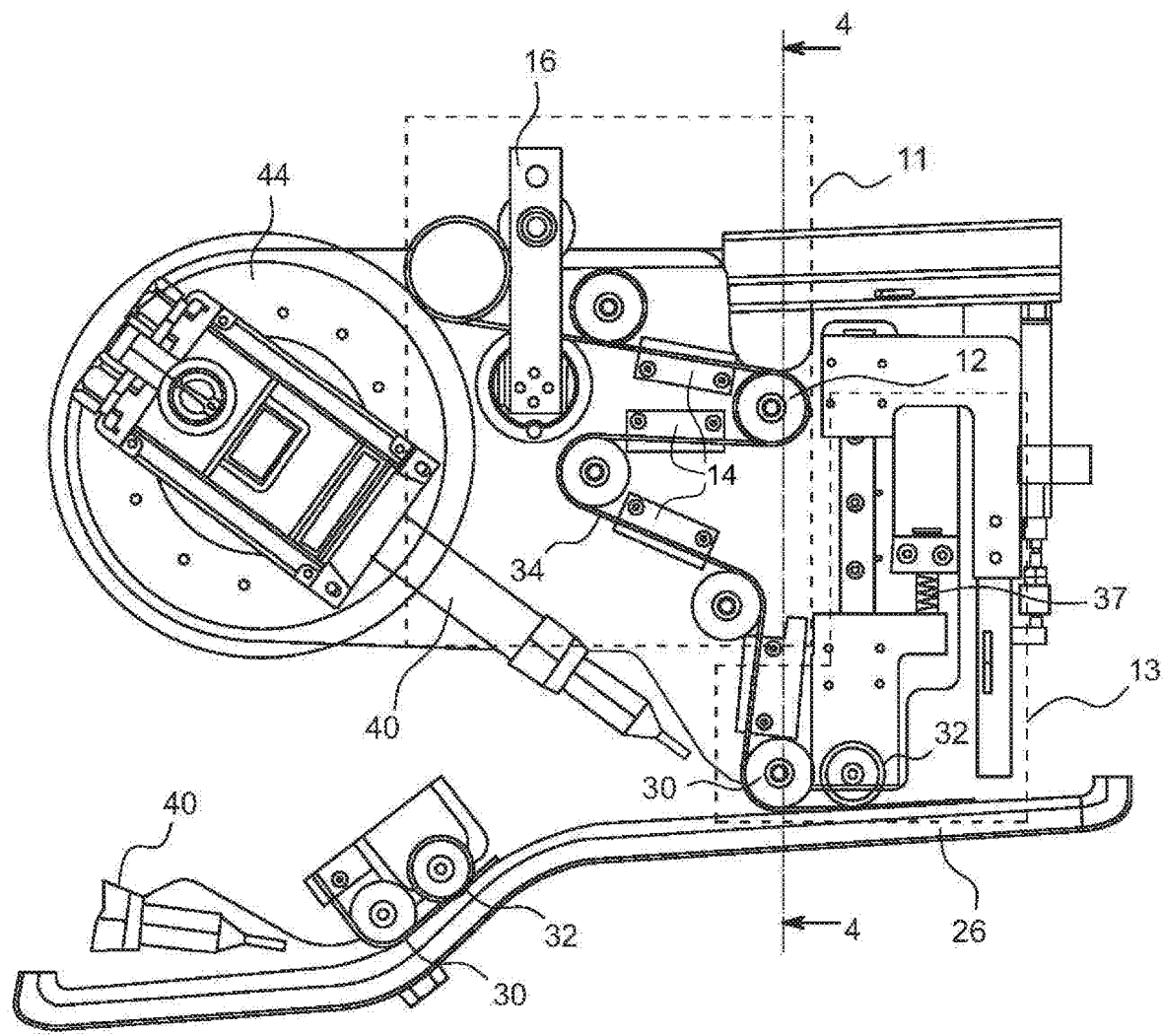
FIG. 2 is a side view of an embodiment of the tape laying head of the invention.

Referring now to FIG. 2, the tape laying head 10 comprises a tape guide assembly 11 mounted on the tape laying head and configured to receive tape from a tape dispenser 22 such as a spool or mandrel or reel and to guide the tape onto a tape receiving surface of a resilient contoured member as the tape laying head 10 travels in the direction of tape laying along the object. The tape guide assembly comprises a plurality of guide means to guide the tape as it is unwound from a spool (or mandrel or reel), passed through the tape guide assembly and applied to the tape receiving surface of the resilient contoured member. Preferably the width of the guide means is substantially the same as the width of the tape. The guide means may comprise guide rollers (or cylinders) 12 or guide tracks 14 or combination thereof to direct the tape through the tape guide assembly. Furthermore, the tape guide assembly may comprise one or more clutches 16 to control the tension in the tape. In batch operation the head may further comprise a tape cutter for cutting the tape at the end of the application in such a way that it is unnecessary to re-thread the tape in the head and a new cycle can be automatically started.

The tape laying head 10 further comprises a tape presser assembly 13 which comprises one or more components, or members, adapted to set the tape on the tape receiving surface and apply pressure on the tape and against the tape receiving surface of the resilient contoured member such as to promote the adhesion of the heated tape. The one or more members of the tape presser assembly are selected from rollers, plates, curved plates and other types of tape application means or any combination thereof when more than one tape presser member is used.

Figure 3:
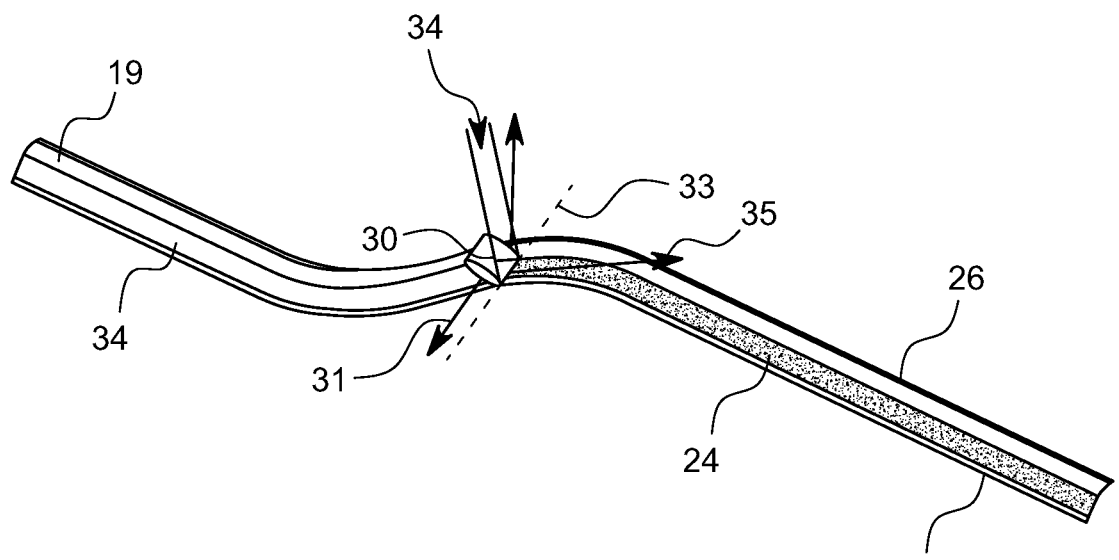
FIG. 3 is a schematic representation of an object and operational axes of an embodiment.

In one embodiment, the tape presser assembly 13 comprises a contact roller 30, rotatably journaled to the tape laying head and serves, together with the positioning of the tape laying head relative to the tape receiving surface, to apply a desired pressure on the tape 34 as it is deposited on the tape receiving surface 24 of the resilient contoured member 23 as the head is moved along the object. With reference to FIG. 3, the contact roller 30 defines a tape contact line 33 along the tape receiving surface 24 (line along which the tape first touches the tape receiving surface) that is substantially parallel to the axis of rotation 31 of the contact roller 30 and substantially perpendicular to the tape laying direction 35. While the contact roller 30 may be sufficient to set the tape on the tape receiving surface 24, additional pressure or tape guiding may be required. In such cases one or more presser member(s) and/or guiding elements may be present. Thus in one embodiment and referring back to FIG. 2, the presser assembly 13 may comprise one or more presser rollers 32, mounted directly on the tape laying head or on a frame (or a back plate) mounted to the tape laying head or a combination thereof, and located downstream (relative to tape laying direction) of the contact roller 30. The one or more rollers have a longitudinal axis (axis of rotation) transversal (substantially perpendicular) to the direction of travel of the tape laying head along the object to apply pressure across the width of the tape receiving surface.

In one embodiment and in order to control the pressure applied on the tape as it is set on the tape receiving surface 24, at least one of the tape presser members is adjustably mounted on the tape laying head 10 or frame to allow vertical movement of its position relative to the tape receiving surface thereby enabling control of the pressure applied on the tape as it is laid on the tape receiving surface and as the tape laying head is displaced along the object. Thus the position of the presser roller 32 relative to the contact roller 30 can be adjusted in a direction substantially perpendicular to the tape receiving surface to enable a smooth, uniform pressure application when the presser assembly, or the tape laying head, is tilted to follow the curvature of the object/tape receiving surface. For example, the presser roller 32 can be attached to a biasing means 37 of a desired tension thereby allowing the presser roller 32 to espouse the contour with a substantially constant pressure. The relative position of presser roller and contact roller can also be adjusted with an automated translation system such as a servomotor that can be programmed to automatically adjust the position of the presser roller 32 (or any tape presser member) as the tape laying head 10 is displaced in the tape laying direction. Similarly the contact roller 30 may also be adjustably mounted to provide for relative positional adjustment as the angle of the head is modified along the object to apply tape to the contoured member.

Furthermore the tape presser roller or rollers and the contact roller may be tiltable about their axis of rotation to adjust the orientation of the presser members to the angle of the tape receiving surface relative to the head. It will be appreciated that when tape presser members are plates, or tape presser members exhibiting other shapes, they can likewise be tilted so that their surface of contact with the tape can also be adjusted to the angle of the tape receiving surface relative to the head.

Alternatively the tape presser assembly members may be fixedly mounted on a tape presser assembly panel which is adjustably mounted on the tape laying head 10 and comprising positional actuator means such that its position can be adjusted to adapt to the angle of the head and the contour of the object to apply proper pressure on the tape and resilient contoured member.

Furthermore, individual members of the presser assembly may be adapted to be independently controllable for relative positional adjustment while the tape presser assembly panel is displaced. Thus the presser assembly can be displaced on the head independently of the motion of the tape laying head and the individual components of the presser assembly independently of the presser assembly plate. The positional adjustment independence of the members of the tape presser assembly enables to control and vary the amount of pressure applied along the contact surface of the tape presser members with the tape/tape receiving surface. For example, it is possible to simultaneously have a tape application pressure at the contact roller 30 that is different from the pressure applied by presser roller 32.

Any or all of the presser assembly members (such as rollers) may comprise a shoulder to allow the tape to be guided on the tape receiving surface especially near the edge of that surface. The shoulder cooperates with the edge of the tape receiving surface to prevent the tape from overhanging. It will be appreciated that the shoulder may resiliently or adjustably cooperate with the edge such as to always remain in contact with the edge with a desired amount of pressure as the contour of the tape receiving surface changes.

The apparatus also comprises a support frame 25 (shown generally in FIG. 1) onto which an object support 27 (see FIGS. 4 and 5) can be mounted to maintain the non-resilient part of the object 19 in a fixed position by object attachment means. The object support also serves to maintain the objet in a predetermined position relative to the tape laying head during the tape laying operation.

The apparatus further comprises a resilient contoured member positioning guide 28 (see FIG. 4 and FIG. 5) configured to support the resilient contoured member 23 while the tape is being applied. The object schematically representing in the figures is a car window seal trim onto which flocking in the form of flocking tape 34 is applied. The trim may have a general "S" shape. The resilient contoured member 23, which is the surface onto which the tape is applied may however exhibit a complex curvature (inclination) relative to the non-resilient part of the trim. As will be appreciated that apparatus and method of the instant invention is not limited to use for tape window seal trims. The complexity of the curvature is reduced for tape application by biasing the lip, in at least one of its sections, with the resilient contoured member positioning guide 28 to generate a tape distortion minimizing receiving surface contour. In this particular example, the lip is biased at a substantially right angle (FIG. 5) in the first part of the object relative to the non-resilient body of the trim. The displacement of the head is then simplified along the "S" shape.

Figure 4:
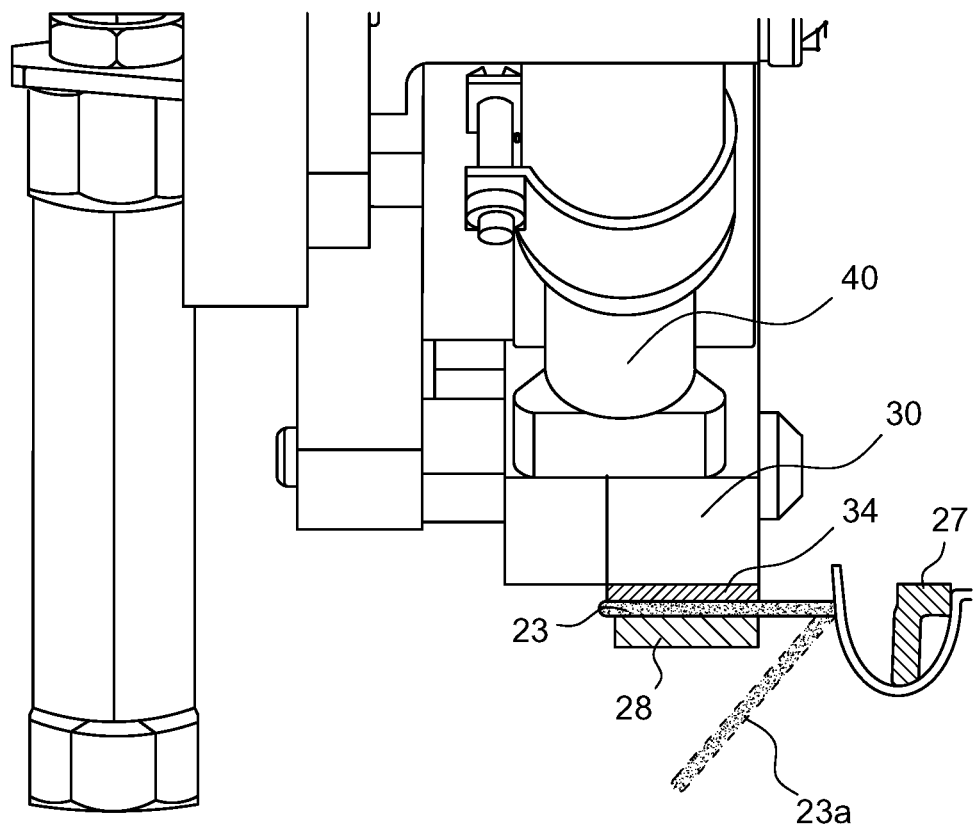
FIG. 4 is cross-sectional view of the tape laying head as shown in FIG. 1.

The complexity of the curvature of the resilient contoured members of certain objects is such that the application of the tape may results in distortions, for example wrinkles, caused by an insufficiently fine tape laying control. Therefore in one embodiment of the invention, the resilient contoured member positioning guide 28 is configured to reduce the complexity of the tape receiving surface contour thereby reducing tape distortion. In one aspect, the resilient contoured member positioning guide 28 is configured to bias at least one section of the resilient contoured member 23 to position the tape receiving surface of the at least one section at a predetermined angle relative to a plane defined by the tape laying direction axis 35 and an axis perpendicular to said tape laying direction axis. In FIG. 4, the resilient contoured member is shown in a non-biased (23*a*) and a biased (23 on positioning guide 28) position. The biasing of selected sections of the tape receiving surface enables a reduction of the complexity of the inclination of the tape receiving surface thereby reducing or eliminating tape distortion within the constraints of the tape laying apparatus and tape characteristics.

The positioning guide may consist of a single unit that provides support along the entire length of the tape receiving surface. The resilient contoured member, once biased, is maintained in a fixed position during the application of the tape.

Figure 5:
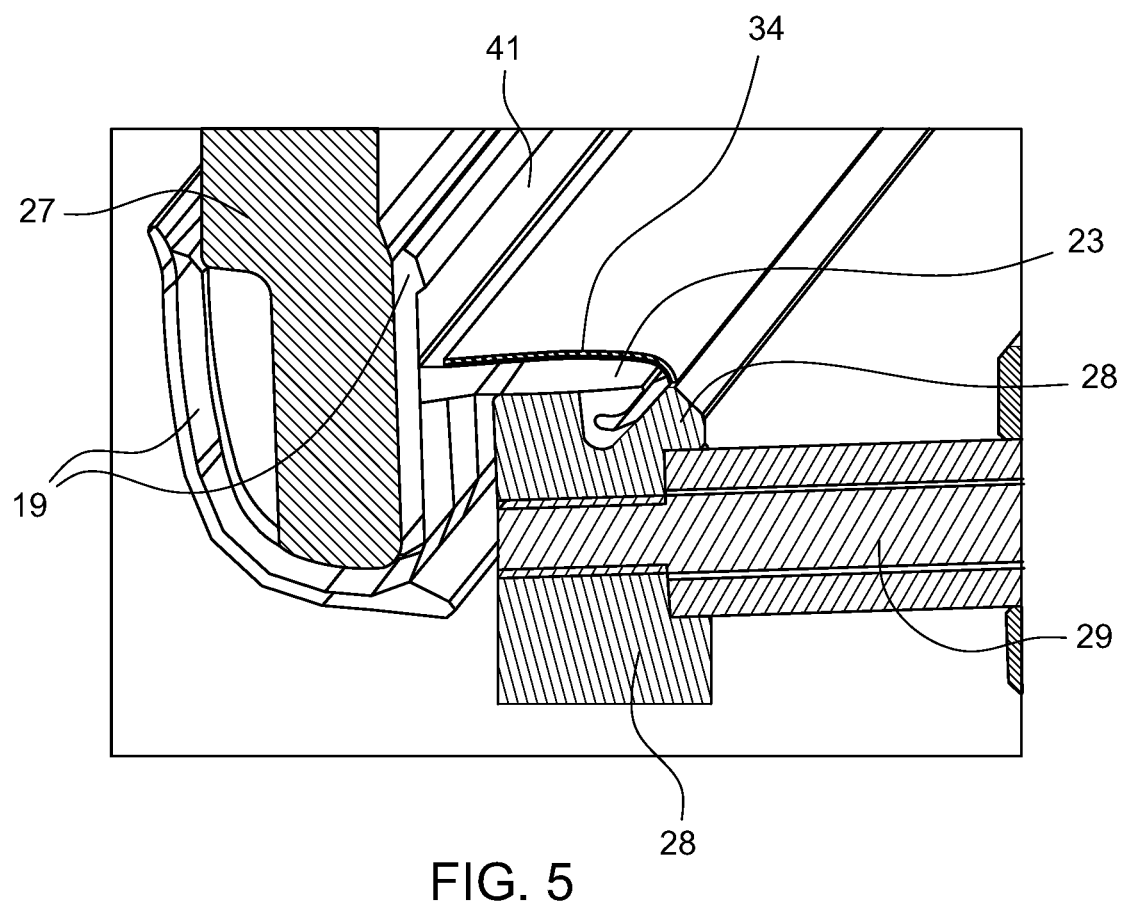
FIG. 5 is cross-sectional view of an embodiment of the object support and resilient contoured member positioning guide of the invention.

Referring to FIG. 5, while they may form a single unit, the object support 27 and the resilient contoured member positioning guide 28 need not be attached or connected together. The resilient contoured member positioning guide may comprise a support frame attachment member 29 enabling the connection to the support frame 25.

In one aspect, the resilient contoured member positioning guide is in contact with the underside of the tape receiving surface (side opposite the tape receiving surface of the resilient contoured member) as shown in FIGS. 4 and 5 and shaped to bias one or more section of the tape receiving surface into a predetermined angle.

The resilient contoured member positioning guide 28 may be moveable, in whole or in part, relative to the support frame and cooperate with the object support 27 to position the resilient contoured member in its desired biased contour position. Thus the support frame attachment member 29 may be coupled to actuators means on the support frame 25 to control the position of the resilient contoured member positioning guide.

Figure 6A:
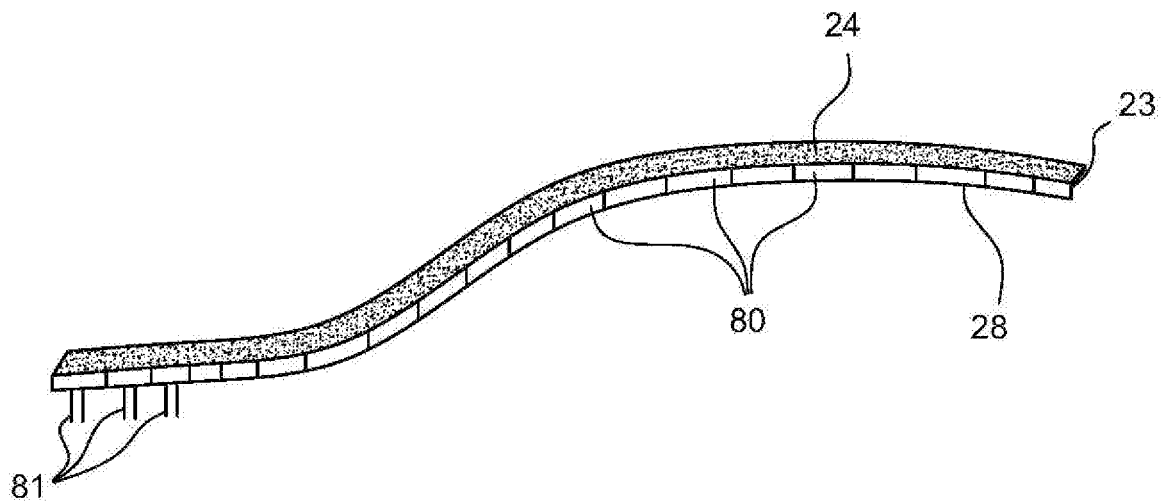
FIG. 6A is an elevation view of an embodiment of the multi-sections resilient contoured member positioning guide of the invention.
Figure 6B:
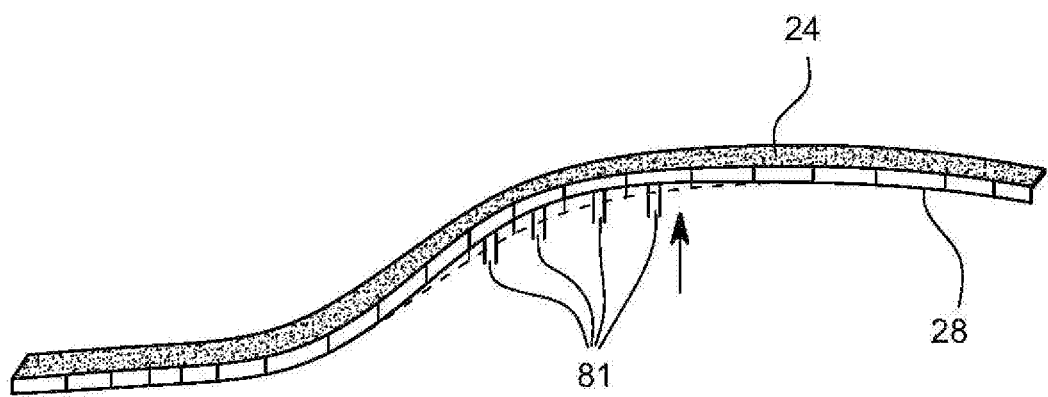
FIG. 6B is an elevation view of an embodiment of the multi-sections resilient contoured member positioning guide of the invention showing a positional adjustment of a tape receiving surface.

Now referring to FIGS. 6A and 6B, in one embodiment the resilient contoured member positioning guide may comprise a plurality of sections 80 that are independently moveable to allow positioning of selected part of the resilient member. Actuators 81, mounted on the support frame and coupled to the sections of the positioning guide (FIG. 6A), can be used to adjust the position of any or all of the sections to configure the positioning guide such that the tape receiving surface is conformed according to a desired contour as shown in FIG. 6B where dotted lines show an original position of the tape receiving surface before adjustment of its position with actuators 81. Such a multi segment support can accommodate objects with different profiles as well as transient biasing as well be further explained below.

The tape presser assembly 13 may also be configured to simultaneously apply tape to a portion of the non-resilient part of the object. For example, referring back to FIG. 5, the tape presser assembly may comprise a side roller to apply tape on the non-resilient part 41 adjacent to the lip.

In another aspect the resilient contoured member positioning guide is displaceable along the resilient contoured member in the tape laying direction. In one such embodiment, the tape laying head may comprise a resilient contoured member positioning guide located under the presser assembly thereby "sandwiching" the tape receiving surface between the positioning guide and the tape presser assembly (as shown in FIG. 7).

Thus the resilient contoured member positioning guide is dynamically displaceable along the tape laying direction axis in synchrony with the tape presser assembly while contacting an underside of said tape receiving surface. The positioning guide cooperates with the tape presser assembly, or members thereof, to dynamically produce the desired contour for the tape receiving surface as the tape is laid onto the surface. As a result, the resilient contoured member is only transiently biased which allows it to return to its normal, or non-biased, state before having substantially cooled off from the heating to promote tape adhesion. This advantageously reduces the potential deformation of the resilient contoured member.

It will be appreciated that dynamical positioning of the resilient contoured member can also be achieved when a multi sections resilient contoured member positioning guide as described above is used. A system processor, as will be described below, can be programed to trigger the actuators 81 coupled to the sections of the positioning guide as a function of the displacement of the tape laying head along the object so as to transiently bias the desired sections of the resilient contoured member.

Figure 7:
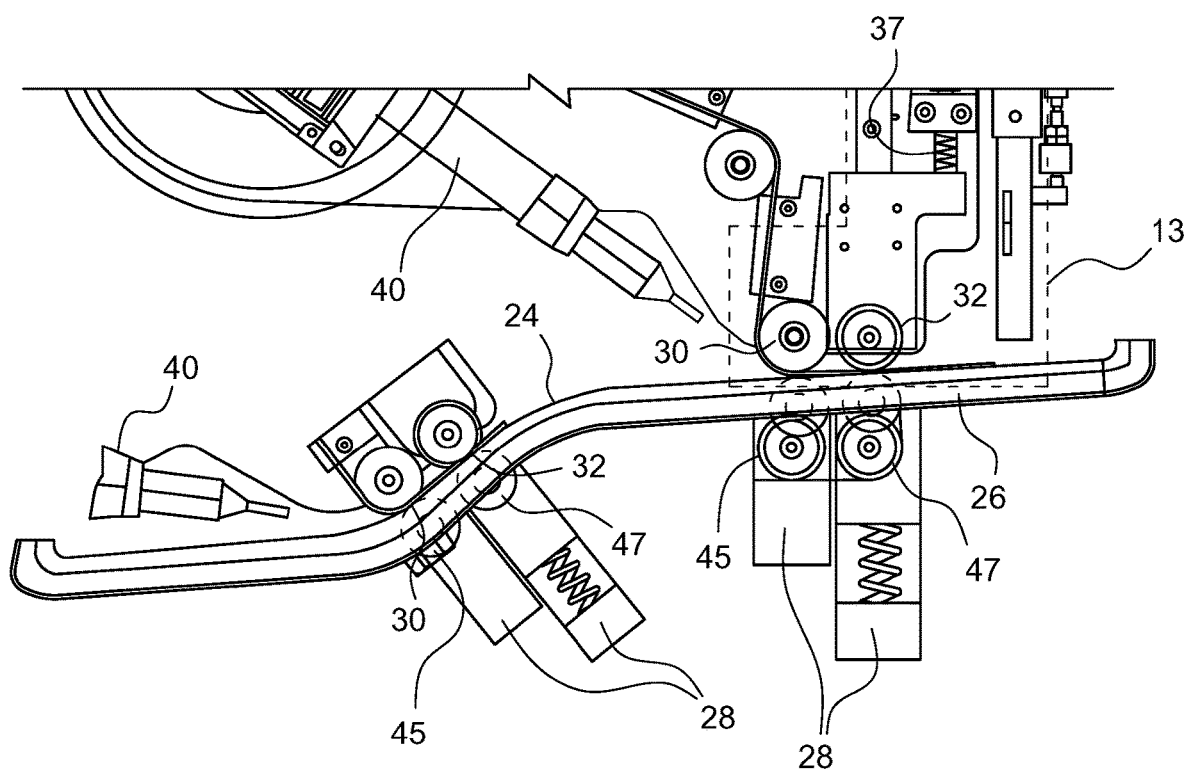
FIG. 7 is a side view of an embodiment of the tape laying head of the invention showing a resilient contoured member positioning guide attached thereto.

In the case where rollers are used, the dynamically displaceable resilient contoured member positioning guide may comprise at least one positioning guide roller 45 aligned with the tape presser assembly contact roller (see FIG. 7). Furthermore the dynamically displaceable contoured resilient member positioning guide may also comprise one or more positioning guide presser roller(s) 47 located downstream of the positioning guide roller, relative to the tape laying direction, and displaceable along an axis substantially perpendicular to a plane defined by the tape contact line and the tape laying direction axis. The positioning guide presser roller(s) may be coupled to a biasing means or a servomotor, for example, to adjust their position along the substantially perpendicular axis in response to contour variations as the tape presser assembly is displaced along the object in the tape laying direction. The positioning guide roller(s) 45 and the one or more positioning guide presser roller(s) 47 may further be tiltable about their axis of rotation to allow adjustment to the tape receiving surface angle. It will be appreciated that when resilient contoured member positioning guide presser members are plates or tape presser members exhibiting other shapes than rollers, they may also be tilted so that the orientation of their surface that contacts the tape to apply pressure on the tape receiving surface is adjusted to the angle of the tape receiving surface.

In one embodiment, the positioning guide has a contact surface with the underside of the tape receiving surface that is substantially identical to dimension of the tape presser assembly contact surface with the tape/tape receiving surface to provide adequate support in the region where the pressure is applied.

The dynamically displaceable contoured resilient member positioning guide can be mounted on the tape laying head 10. Or it can be mounted on a separate structure, for example on the support frame, and displaceable in the tape laying direction and configured to synchronize its displacement as well as the movement of the resilient member positioning guide components with that of the tape laying head and its components.

In another embodiment there is also provided a resilient contoured member adaptor that is placed between the positioning guide and the underside of the resilient contoured member and generally comprises a resilient contoured member contacting face and a resilient contoured member positioning guide contacting face. The resilient contoured member adaptor may be particularly useful when the underside of the resilient contoured member is not plane or regular. In this case the resilient contoured member contacting face of the adaptor can be configured to match (or be complementary to) the underside surface of the resilient contoured member while the position guide contacting face may plane thereby allowing support and biasing of the resilient contoured member without deforming it.

Figure 8A:
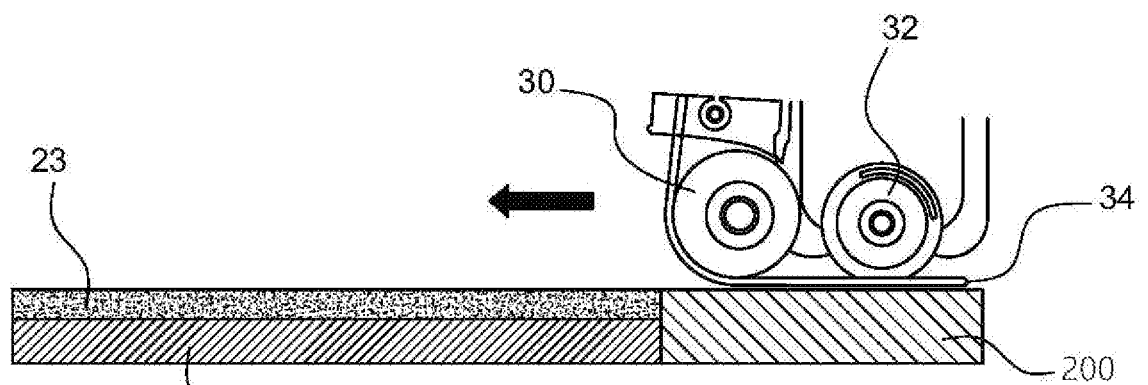
FIG. 8A is a cross-sectional view of an embodiment of the resilient contoured member positioning guide of the invention shown with tape initiation member.

As shown in FIG. 8A a tape laying initiation member guide 200 may be provided to initiate tape application. The tape presser elements first contact the initiation member guide 80 and provide a smooth transition onto the tape receiving surface.

Figure 8B:
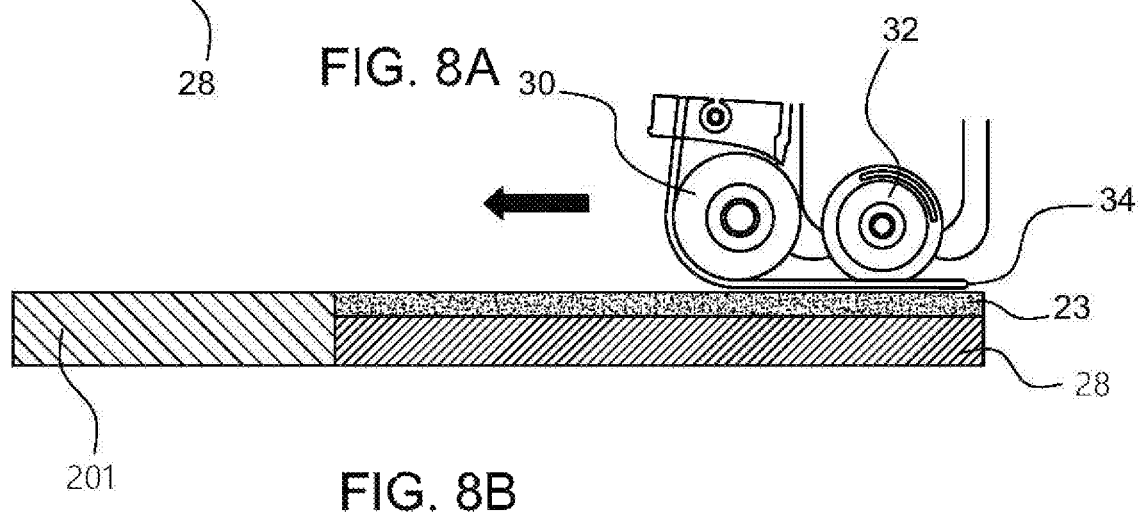
FIG. 8B is a cross-sectional view of an embodiment of the resilient contoured member positioning guide of the invention shown with tape termination member.

Similarly, as shown in FIG. 8B, a tape laying termination member guide 201 may be provided to facilitate tape application termination. The tape presser elements can transition smoothly onto the termination member guide 201 before the tape presser assembly is lifted off.

In one embodiment the tape laying initiation and/or termination member guide is anti-adhesive.

The tape receiving surface of the resilient contoured member may not necessarily be plane. The tape receiving surface may itself present a certain degree of contour (see FIG. 9). In these cases, the tape presser assembly may comprise rollers that are adapted or adaptable to the tape receiving surface contour. Examples may include resiliently deformable rollers 91, segmented rollers 90 (see FIG. 10A) and the like. Segmented rollers can in particular provide a contact line 33 (shown in FIG. 3) adjustment by dynamically changing the position of individual segments of the roller(s) along the direction of the tape application as shown in FIG. 10B where the individual segments of the roller are shown in a staggered arrangement.

It will be appreciated that the configurations of apparatus described above enables application of tape on resilient members attached to non-resilient part that are contoured in three dimension (and not only in single plane). In other words the apparatus enables changes of direction of tape application not only in a direction substantially perpendicular to the tape receiving surface but also in a direction substantially parallel to the tape receiving surface (in the direction of axis 31 in FIG. 3).

We now describe the generation and directional propagation of heat that promotes the binding of the tape on the resilient contoured member. The application of thermosetting tapes on tape receiving surfaces can be very sensitive to the amount of heat necessary for optimal adhesion. Furthermore, excessive heat may deform the tape or the tape receiving surface, especially on contoured tape receiving surfaces.

Different types of heat source may be used including but not limited to heated gas, infrared radiations and heated components of the tape laying apparatus.

In a preferred embodiment, and with reference to FIG. 1 the source is a heated gas and a heater assembly is provided that comprises a nozzle 40 to deliver heated gas to a region substantially at the point (or region) of contact between the tape and the tape receiving surface. Thus the heat can be applied to the tape and tape receiving surface simultaneously at or near the point of contact between the two. The nozzle is preferably attached to the tape laying head 10 but could also be mounted on another structure such as a second independent robotized head. In the case where it is attached to another structure, the structure is configured to dynamically displace the nozzle along with the tape laying head, during tape laying operation, by preserving a predetermined position relative to the tape-tape receiving surface contact point.

The nozzle can be mounted on a nozzle positioning assembly 44 for radial and/or axial displacement. The orientation of the nozzle can be dynamically adjusted during tape laying operation to optimize heat activation of the tape on the tape receiving surface. Thus the nozzle may be positioned in a fixed position relative to the point of tape-tape receiving surface contact or its position may be adjusted, and preferably automatically adjusted, to optimize the heat delivery as the relative position of the tape and the tape receiving surface varies along a contour surface while the head travels to apply the tape.

In one preferred embodiment the nozzle is mounted on the head while the gas is delivered to the nozzle from a gas container through a conduit to generate a gas jet at the exit of the nozzle. The gas may be heated at any point along its traveling path as would be known in the art. In a preferred embodiment the gas is directed on the side of the tape that is making contact with the tape receiving surface as shown in FIGS. 1 and 2.

The nozzle's shape at its mouth can be configured for optimal delivery of the gas. Depending on the tape and tape receiving surface configuration, the nozzle's shape is designed to produce a controlled flow of gas both directionally and with regard to the flow rate. In one embodiment, the nozzle's shape is adjustable, for example by comprising retractable or movable parts, and preferably adjustments can be made as the tape is being applied to vary the amount of heat delivered to sections of a tape receiving surface that would differ in geometry or composition and therefore require different amount of heat.

Figure 11:
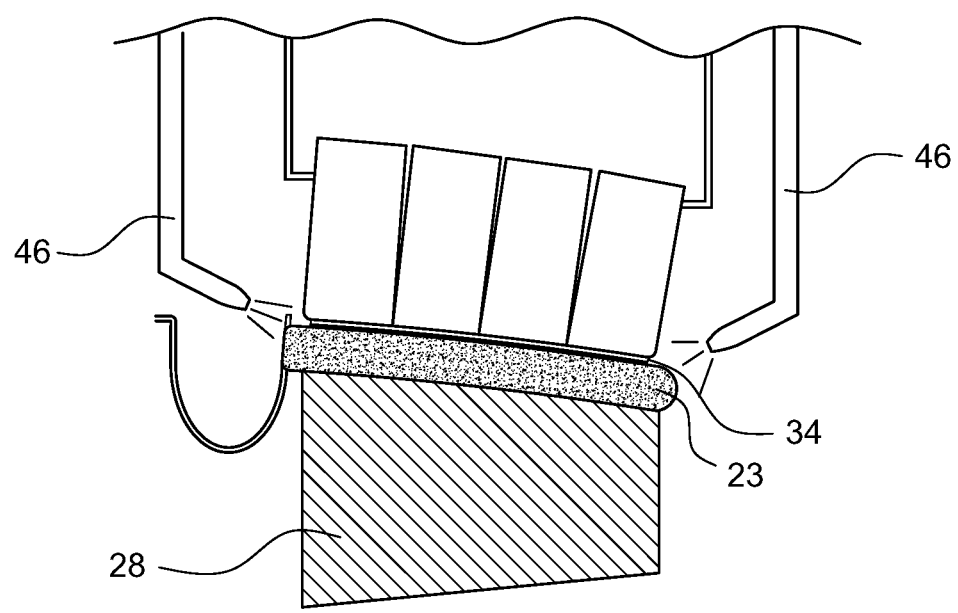
FIG. 11 is a cross-sectional view of an embodiment of a segmented roller of the invention shown with side nozzles.

The configuration of the heat delivery components can provide different amount of heat on the tape receiving surface. FIG. 11 shows an arrangement where the heat is delivered with nozzles 46 on both sides of a tape presser contact roller so that different amount of heat may be applied along the cross section of the resilient contoured member (edges versus middle part).

Because the amount of heat absorbed by the tape and the tape receiving surface depends on the rate at which the heat is provided, the apparatus of the invention provides a unique arrangement to adjust the heating rate. More specifically the amount of heat delivered can be controlled by the rate of displacement of the thermosetting head, the flow rate of the gas coming out of the nozzle and the temperature of the gas itself. This is made possible because the heater (the nozzle) can be displaced along the tape receiving surface in synchrony with the displacement of the head along the tape receiving surface and the process parameters can be simultaneously adjusted.

It will be appreciated that while air is the preferred gas, other gas compositions may be used and actually be selected to optimize the heat capacity of the gas and/or its chemical compatibility with the tape and tape receiving surface. The gas is preferably provided as compressed gas, the flow of which being adjustable through valves as would be known in the art.

It will further be appreciated that the members of the tape presser assembly and the resilient contoured member positioning guide may be controllably heated to further optimize the heat activation of the tape as it is applied to the tape receiving surface.

There is also provided a method for applying a thermosetting tape on a tape receiving surface of a resilient contoured member of an object, the method comprising providing a tape laying apparatus comprising a tape laying head and an object support to stabilize the object while tape is laid onto the tape receiving surface, biasing at least one section of the resilient contoured member to position the tape receiving surface of the at least one section at a predetermined angle relative to a plane defined by a tape laying direction axis and an axis perpendicular to the tape laying direction axis and contacting the tape receiving surface with the tape while the tape laying head is displaced in a tape laying direction and while simultaneously directing heat at the tape and tape receiving surface near a tape-tape receiving surface contact point to activate binding of the tape to the surface.

By biasing it is meant positioning the resilient contoured member at an angle that is different than a resting (non-biased) angle.

The biasing can be effected by a resilient contoured member positioning guide to position the tape receiving surface as described above. The positioning guide can be moveable and capable of generating a desired tape receiving surface contour while providing support for tape application. In the sections of the resilient contoured member that are not biased for tape application, the resilient member positioning guide provides support while maintaining the resilient member in a resting or non-biased conformation.

Therefore in one aspect of the method the biasing is a transient biasing. By transient it is meant that the section being biased remains biased for a time shorter than the time required to apply the tape to the entire tape receiving surface. The ability to control the duration of the biasing so that a non-biased conformation may be restored as soon as possible after tape has been applied to a particular section reduces the stress to the resilient contoured member and reduces the chance of permanent deformation that a cooling off in a biased position might create.

Biasing of resilient material can change the heat capacity of the material. Therefore tape distortion can be further minimized by adjusting the amount of heat applied on the biased section of the object. Thus, in an aspect of the method the amount of heat applied is modulated along the tape receiving surface according to the biasing pattern. For example, it may be possible to reduce the amount of heat in a biased section and still achieve a similar amount of heat absorption by the resilient member as in a non-biased section and therefore have an equivalent binding activation. Heat capacities of the tape, the resilient member, in biased (stretched) and non-biased conformations and the contribution of the non-resilient part of the object to the heat capacity of the resilient member may be taken in consideration to determine the amount of heat to provide.

For similar reasons the amount of heat may also be modulated across the tape contact line (across one section of the tape receiving surface) to account for variation in heat capacities of the tape and resilient member in a cross section along the tape contact line 33 on the tape receiving surface.

In one aspect of the method, the pressure applied on the tape and tape receiving surface is adjusted as a function of the curvature of the resilient member at any particular point along the tape receiving surface. In some cases it may be advantageous to reduce the pressure in regions where the resilient member is biased.

Furthermore in another aspect of the method the pressure generated by the tape presser assembly is controllably adjusted as a function of downstream distance from the tape contact line 33 along the length of the tape presser assembly that is in contact with the tape/tape receiving surface. For example when the tape presser assembly comprises a contact roller and one or more presser rollers as shown in FIG. 2, the pressure generated by the presser roller 32 can be adjusted to be different then the pressure applied by the contact roller 30. Thus the tape presser assembly can be a variable pressure applicator. The variability of the pressure along the tape presser assembly can also be generated by a contact plate having a predetermined thickness profile along the direction of tape application thereby creating a differential height of the space between the resilient contoured member positioning guide and the contact plate and consequently a difference in the pressure applied to the tape/tape receiving surface.

The method also encompasses the adjustment and control of parameters such as, but not limited to heat, heating rate, heat directionality, rate of tape application, speed of the tape laying head and pressure applied to the tape.

Therefore in one example of the method one or more selected sections of the resilient contoured member are transiently biased and the tape is applied using dynamic pressure adjustment while the temperature of tape binding activation is modulated according to the biased contour of the resilient member.

The predetermined resilient contoured member angle of the tape receiving surface at a particular point or section of the resilient contoured member is determined to minimize tape and resilient contoured member distortion as the tape is laid onto the contoured surface. The predetermined angle of the tape receiving surface may be determined by obtaining the relative curvature of the resilient contoured member in a non-biased state and designing a tape distortion minimizing receiving surface contour comprising one or more biased section(s) by taking into consideration material, geometric and process parameters.

Obtaining the relative curvature of the resilient contoured member may be accomplished by method known in the art such as image processing, fiducial points registration and the like. The curvature may also be obtained from the manufacturing specifications of the object. The non-biased contoured tape receiving surface is then analyzed to identify the one or more section(s) that requires biasing during the process of tape application. The parameters taken in consideration may include but are not limited to heat capacity, elasticity, hardness (Shore durometer), degrees of freedom of the tape laying head, working envelope, accuracy, and other characteristics that would be known to those skilled in the art. The 3-D shape of the non-resilient part of the object to which the resilient contoured member is attached is also taken in consideration.

The method may include the preparation of samples with a range of predetermined angles and/or process parameters for the one or more biased sections of the resilient member and assessing tape distortion and/or resilient member deformation to select optimal parameters.

The initiation of the tape laying operation may comprise a step of contacting the tape with a tape laying initiation member guide prior to contacting the tape receiving surface and displacing the tape laying head in the tape laying direction to smoothly transition from the tape laying initiation member to the resilient contoured member. This initiation step may reduce tape distortion at the extremity of an object to be taped by providing a smooth transition between the tape laying initiation member guide and the extremity of the tape receiving surface. The overhanging tape portion that exceeds the length of the tape receiving surface may be cut during the tape laying process or after the process is completed.

Similarly, the termination of tape laying operation may comprise a step of contacting the tape with a tape laying termination member guide after completion of the tape application operation in a continuous fashion to provide a smooth transition from the ending extremity of the tape receiving surface and the tape laying termination member guide. Similarly to the initiating step, this termination step may reduce tape distortion at the extremity of an object to be taped by providing a smooth transition between the tape laying termination member guide and the ending extremity of the tape receiving surface. The overhanging tape portion that exceeds the length of the tape receiving surface may be cut during the tape laying process or after the process is completed.

Heat may be applied while the tape is contacting either the initiation or termination guide.

Figure 12:
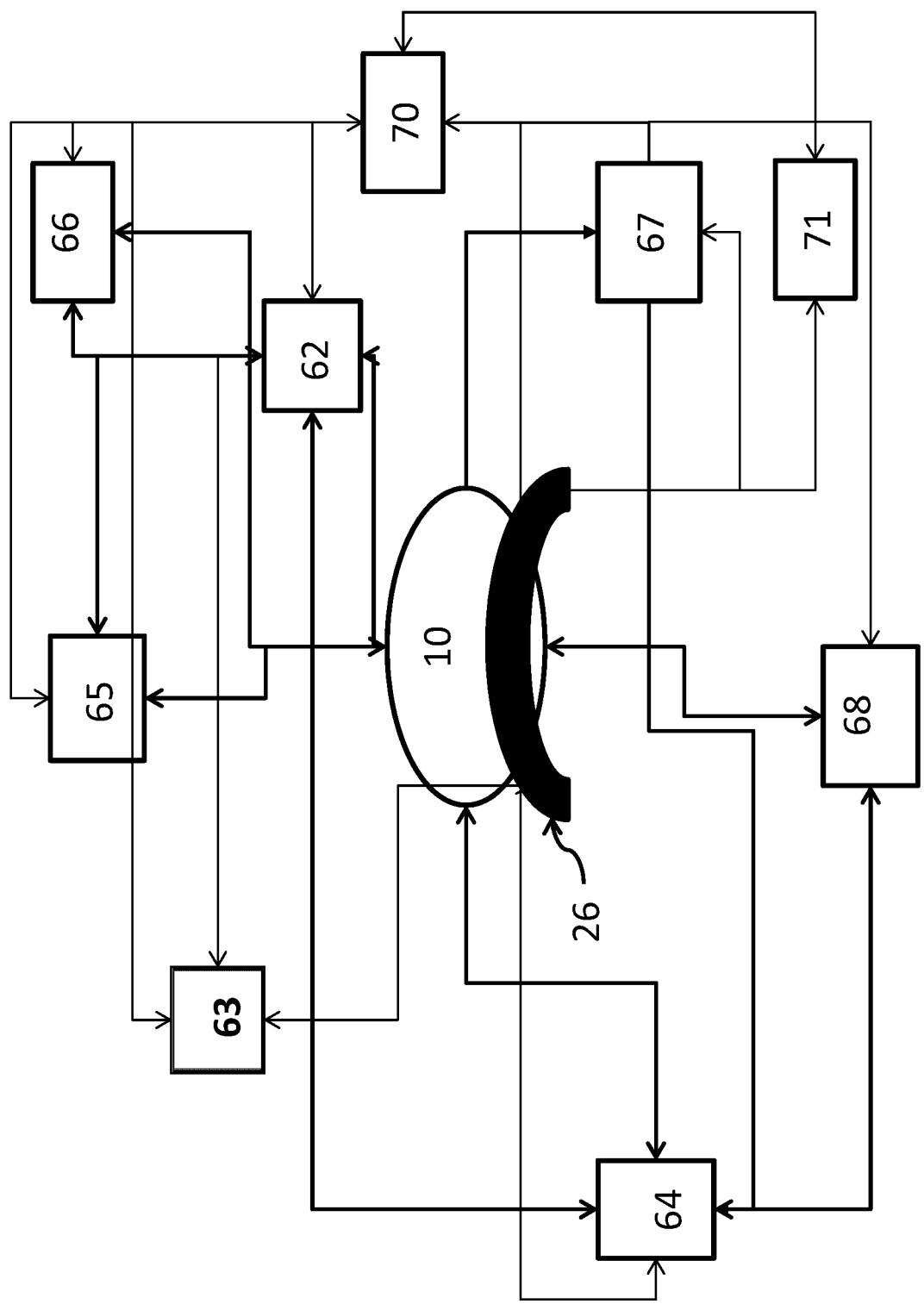
FIG. 12 is diagram of the controllers and processors of an embodiment of the invention.

In yet another aspect of the invention there is provided a thermosetting tape application system comprising a thermosetting tape apparatus according to any of the embodiment described above and controllers and processors for controlling the various functions of the apparatus as will be further described below and with reference to FIG. 12.

The system generally comprises a tape laying head position controller 62, a tape presser assembly controller 65, a resilient contoured member positioning guide controller 63, a heat controller 64, a tape tension controller 66, temperature sensor 67 and a heat source (such as heated gas supply) 68.

The system further comprises a processor 70 to coordinate (system processor) and execute process programs. The processor 70 may receive inputs such as tape receiving surface contour data from an image sensor, temperature and operator commands for example. Optionally the system may comprise a biased tape receiving contour determinator 71.

The tape laying head motion is controlled by tape laying head position controller 62 which can control the orientation of the tape laying head 10 as well as its rate of displacement along any axis and in particular along a tape application direction on the tape receiving surface 24 on object 26.

The tape tension controller 66 is configured to control the various components of the head, such as clutches, that affect tape tension as well as the parameters of the tape dispenser such as speed of unwinding for example.

The tape presser assembly controller 65 provides positional control over the various components of the assembly. It will be understood that the position of the components (such as the contact roller and presser rollers for example) of the presser assembly can be dynamic (as the tape laying head travels along the tape receiving surface) and be coordinated with the motions of the tape laying head. In an aspect the tape presser assembly controller is configured to enable differential pressure application along the length of the surface contacted by the presser members for example by controlling the vertical position of the presser roller relative to the tape receiving surface and independently of the vertical position of the contact roller. In this respect, the system processor 70 serves to receive inputs in the form of position coordinates of the tape laying head and the presser assembly and its components and provides control outputs to various actuators based on predetermined time dependent spatial coordinates as well as rate of displacement to control the tape application operation.

In the case where the resilient contoured member positioning guide in its entirety or in part is moveable to bias the resilient member and optimize tape laying application, there is provided a resilient contoured member positioning guide controller 63. The resilient contoured member positioning guide controller receives input from the system processor 70.

Heat controller 64 is configured to receive inputs and adjust all parameters that affect heat delivery at or around the point of contact between the tape and tape receiving surface. In particular the heat controller 64 is coupled to the tape laying head position controller 62, the heat source 68, the tape presser assembly controller 65, the resilient contoured member positioning guide controller 63, the temperature sensor(s) 67 and the system processor 70. The temperature sensor(s) 67 is configured to optionally measure the temperature of various components of the system such as the tape receiving surface, the tape receiving surface positioning guide, the heater and the gas exiting the heater.

The system may comprise various sensors (temperature, tension, mechanical pressure) to adjust these parameters in real time.

The object can be automatically placed on the object support and removed after completion of the application of the tape on the tape receiving surface by an object feeder controlled by processor 70.

What is claimed is:

1. A method for applying a thermosetting tape on a tape receiving surface of a resilient contoured member of an object, the method comprising:
    providing a tape laying apparatus comprising a tape laying head, an object retaining support to stabilize the object while the thermosetting tape is laid onto the tape receiving surface and a resilient contoured member positioning guide,
    biasing, with said resilient contoured member positioning guide, at least one section of the resilient contoured member to position the tape receiving surface of the at least one section at a predetermined angle relative to a plane defined by a tape laying direction axis and an axis perpendicular to said tape laying direction axis, said predetermined angle being different than a resting angle of said at least one section, and
    contacting the thermosetting tape with the tape receiving surface to produce a taped surface,
    applying heat to the tape and tape receiving surface near a tape-surface contact point to activate binding and
    applying a pressure on the thermosetting taped surface while the tape laying head is displaced in a tape laying direction.

2. The method as claimed in claim 1 wherein the biasing is a transient biasing lasting for a period of time less than a time required to complete thermosetting tape application on an entire tape receiving surface.

3. The method of claim 1 wherein the resilient contoured member positioning guide is moveable during thermosetting tape application and wherein the method further comprises a step of displacing the resilient contoured member positioning guide in synchrony with the tape laying head.

4. The method of claim 1 wherein the step of applying pressure comprises a dynamic adjustment of the pressure as a function of the biasing of the resilient contoured member.

5. The method of claim 1 wherein the predetermined angle of the tape receiving surface is determined by obtaining the relative curvature of the resilient contoured member in a non-biased state and establishing a tape distortion minimizing receiving surface contour comprising one or more biased section.

6. The method as claimed in claim 1 wherein the tape laying apparatus further comprises a tape laying initiation member guide and wherein the method further comprises initiating thermosetting tape laying on the tape laying initiation member guide prior to thermosetting tape laying on the resilient contoured member and wherein the tape laying apparatus further comprises a tape laying termination member guide and wherein the method further comprises terminating thermosetting tape laying on the tape laying termination member guide after thermosetting tape laying on the resilient contoured member is completed.

7. An apparatus for applying thermosetting tape on a resilient contoured member of an object, said resilient contoured member attached to a non-resilient member of the object, the resilient contoured member having a tape receiving surface exhibiting a contour with respect to the non-resilient member along a tape laying direction, the apparatus comprising:
    an object support mounted on a support frame to maintain the object in fixed position during thermosetting tape application,
    a tape laying head configured to be displaced along the resilient contoured member in the tape laying direction,
    a tape dispenser to feed the thermosetting tape to the tape laying head,
    a tape guide assembly and a tape presser assembly mounted on the tape laying head, the tape presser assembly mounted downstream of the tape guide assembly, wherein the tape guide assembly is configured to guide the thermosetting tape to the tape presser assembly, said tape presser assembly comprising a tape contact member configured to guide the thermosetting tape on the tape receiving surface and apply pressure on the thermosetting tape and the tape receiving surface as the thermosetting tape is laid onto the tape receiving surface and defining a tape contact line between the thermosetting tape and the tape receiving surface and a tape presser assembly contact surface,
    a heater configured to apply heat substantially at the tape contact line to heat activate binding of the thermosetting tape to the resilient contoured member as the tape laying head is displaced along the object,
    a resilient contoured member positioning guide configured to bias at least one section of the resilient contoured member to position the tape receiving surface of the at least one section at a predetermined angle relative to a plane defined by a tape laying direction axis and an axis perpendicular to said tape laying direction axis while providing support for thermosetting tape laying, said predetermined angle being different than a resting angle of said at least one section, and
    wherein said resilient contoured member positioning guide is also configured to provide support for laying thermosetting tape along substantially all the tape receiving surface.

8. The apparatus of claim 7 wherein the tape presser assembly is coupled to a tape laying head axial movement actuator to move the presser assembly on the tape laying head along an axis substantially perpendicular to the tape receiving surface at any point along the resilient contoured member.

9. The apparatus of claim 8 wherein said tape presser assembly further comprises one or more tape presser members located downstream of said tape contact member relative to the tape laying direction.

10. The apparatus of claim 9 wherein said tape contact member and one or more tape presser members are coupled to respective tape presser assembly axial movement actuators independently displaceable within said tape presser assembly vertically in a direction substantially perpendicular to the tape receiving surface and laterally along an axis substantially parallel to tape laying direction.

11. The apparatus of claim 7 wherein the resilient contoured member positioning guide is in contact with an underside of said tape receiving surface.

12. The apparatus of claim 11 wherein the resilient contoured member positioning guide is mounted on a positioning guide support configured to be dynamically displaced along the tape laying direction axis in synchrony with the tape presser assembly while contacting the underside of said tape receiving surface.

13. The apparatus of claim 12 wherein said positioning guide support is the tape laying head.

14. The apparatus of claim 7 wherein said resilient contoured member positioning guide comprises a tape laying initiation member to enable a continuous tape laying process at a start extremity of said resilient contoured member.

15. The apparatus as claimed in claim 7 wherein the tape laying head is configured to be moveable about more than two axes relative to the object.

16. The apparatus of claim 7 wherein said heater is mounted on the tape laying head.

17. A system for applying thermosetting tape on a resilient contoured member of an object, comprising
a thermosetting tape laying apparatus as claimed in claim 7,
a tape laying head position controller,
a tape presser assembly controller,
a resilient contoured member positioning guide controller for controlling a biasing of the resilient contoured member,
a heat controller, and
a system processor configured to receive inputs and provide outputs to the controllers to execute the tape application process.

18. The system as claimed in claim 17 further comprising a resilient contoured member image sensor to register a conformation of said resilient contoured member.

19. The system as claimed in claim 17 further comprising a biased tape receiving contour determinator.

20. The system as claimed in claim 17 further comprising an object feeder system to automatically position the object on the support and remove the object after the application of the thermosetting tape is complete.

* * * * *